United States Patent Office 3,228,987
Patented Jan. 11, 1966

3,228,987
BORON-CONTAINING COMPOUNDS
John A. Dupont and Marion F. Hawthorne, Huntsville, Ala., assignors to Rohm & Haas Company, Philadelphia, Pa., a corporation of Delaware
No Drawing. Filed Mar. 24, 1961, Ser. No. 98,263
6 Claims. (Cl. 260—606.5)

This invention concerns compounds formed by the reaction of decaborane adducts, $B_{10}H_{12} \cdot X_2$, in which X is selected from the group consisting of $CH_3CN$, $(CH_3)_2S$ and $(C_2H_5)_2S$, and diacetylene. It specifically concerns biscarborane, the product formed by the interaction of at least two moles of the decaborane adduct with one mole of diacetylene.

The field of boron chemistry, particularly the chemistry of the higher boron hydrides, such as decaborane, is so new that the nomenclature for many of the compounds has not yet been definitely fixed. However, chemists working in this field have agreed that the product formed by the reaction of at least two moles of a decaborane adduct of the formula $B_{10}H_{12} \cdot X_2$ and diacetylene is biscarborane with the formula $$HC_2B_{10}H_{10}C_2B_{10}H_{10}H$$

or, as commonly written,

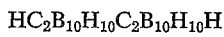

in which the symbol —θ— represents $-C_2B_{10}H_{10}-$. This nomenclature will be used throughout the specification and the claims. Thus, the biscarboranyl radical is represented by the formula

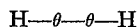

The compounds of the present invention are useful as high energy components of propellant compositions, either as such, or when further reacted to introduce polymerizable groups into the molecule.

Biscarborane, 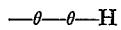, can be prepared by the reaction of at least two moles of a decaborane adduct of the formula $B_{10}H_{12} \cdot X_2$, with diacetylene. Presumably, carboranylacetylene, H—θ—C≡CH, is the product formed as the intermediate which then reacts with an additional mole of $B_{10}H_{12} \cdot X_2$ to produce biscarborane.

Biscarborane can be prepared by a one-step process in which diacetylene is reacted with at least two moles of the decaborane di-adduct. However, the yields from this one-step process are low, and prolonged reaction times are required. It has been found that if carboranylacetylene is isolated from the reaction mixture, purified, for instance by treatment with basic alumina, and then reacted with additional decaborane di-adduct, the yields of biscarborane are appreciably improved and the reaction times are shortened. The preparation of carboranylacetylene is described in a co-filed application, Serial No. 98,261, filed on even date herewith.

Diacetylene, HC≡C—C≡CH, was prepared using the method of Armitage et al., J. Chem. Soc. 44 (1951), and this method of preparation is included herein by reference. The method comprises the dehydrochlorination of 1,4-dichlorobutyne-2 in dioxane solutions with potassium hydroxide.

Although there are numerous di-adducts of decaborane which will react with diacetylene or carboranylacetylene to yield bisbarborane, the preferred adduct is the bis(acetonitrile) adduct, $B_{10}H_{12} \cdot 2CH_3CN$, commonly referred to as "BAND." This designation will be used throughout the specification and the claims. This adduct was prepared by the method of Schaeffer as set forth in J.A.C.S. 79, 1006 (1957) and this method of preparation is incorporated herein by reference.

Typical of other adducts which can be employed are the dialkyl sulfide addition products of the general formula $B_{10}H_{12} \cdot 2R_2S$ in which R is preferably methyl or ethyl.

The reactants and reaction conditions should be anhydrous and the reaction should be carried out in an inert atmosphere. This is most easily effected by flushing the reactor prior to addition of the reactants with a dry inert gas and continuing the flow of the dry inert gas during the reaction period. Typical of such inert gases are nitrogen, helium and argon.

The ratios of carboranylacetylene to the decaborane di-adduct can be varied over wide ranges without departing from the concept of this invention. However, since theory requires one mole of carboranylacetylene per mole of di-adduct, this is a preferred minimum ratio. Since excess di-adduct can be readily removed from the reaction mixture and re-used if desired, it is preferred to use a small excess of the di-adduct. A ratio of one mole of carboranylacetylene to 1.25 moles of di-adduct is particularly preferred when BAND is the di-adduct used.

Biscarborane is prepared by refluxing, in solution, a mixture of carboranylacetylene and the di-adduct for 10 to 20 hours. The biscarborane crystallizes from the reaction mixture on cooling, and any unreacted BAND is removed by treating the crystalline mass with an aromatic hydrocarbon, such as benzene. The benzene dissolves the biscarborane, but only dissolves a portion of any unreacted BAND. This is removed by filtration. Evaporation of the benzene solution to about ⅒ to ⅟₁₅ of its original volume causes precipitation of additional BAND, which is again removed by filtration. The benzene solution is washed with dilute HCl, water and then dried and passed through a column of basic alumina to remove color. Evaporation of this solution gives a white solid, impure biscarborane, which was washed with pentane to remove any unreacted carboranylacetylene and then dried.

As long as BAND is used, or there are present two moles of acetonitrile per mole of decaborane, other inert solvents can be employed. Typical of such solvents are benzene, toluene or xylene.

The reaction temperature for the preparation of biscarborane can be varied from 50° C. to 120° C. A preferred range is 75° C. to 90° C.

As set forth hereinbefore, biscarborane and its derivatives are valuable as components of propellant compositions. A typical formulation is as follows:

| Component: | Percent by weight |
|---|---|
| Ammonium perchlorate | 60.0 |
| Biscarborane | 15.0 |
| Carboranylmethyl acrylate | 12.5 |
| TEGDN [1] | 12.5 |
| Benzoyl peroxide | 1.0 |

[1] TEGDN is triethylene glycol dinitrate.

This composition was cast into motor casings and cured at 80° C. for ten hours. The burning rates were 1.20 in./sec. at 500 p.s.i. and 1.75 in./sec. at 1000 p.s.i. Physical properties of the "grain" and the bonding to the motor casing were satisfactory.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

EXAMPLE I

*Preparation of carboranylacetylene.*—To a well-stirred, refluxing suspension of 375 grams (1.87 moles) of bis (acetonitrile) decaborane, in 1.5 liters of dry acetonitrile, was added under nitrogen, a solution of 94.4 grams (1.89 moles) of diacetylene in 300 ml. of acetonitrile. The addition was carried out over a forty-five minute period after which the solution was refluxed for approximately four hours (the reaction solution was refluxed one hour after becoming homogeneous). The solution was stripped to a syrup using a rotary evaporator, treated with 500 cc. of 10% sodium hydroxide and extracted three times with 500–700 ml. portions of pentane. The combined pentane extracts were dried over anhydrous magnesium sulfate and concentrated to about one-half their original volume. This slightly yellow pentane solution was passed through a bed of basic alumina and the resulting colorless solution was concentrated to 200 ml. The white solid (biscarborane, 12 grams) which appeared was filtered off and washed with a small amount of pentane. The filtrate was evaporated to dryness yielding 110 grams (35%) of carboranylacetylene, a waxy white solid of M.P. 63–70° C. Repeated recrystallization from pentane at −80° C. afforded a material of M.P. 75–78° C.

*Analysis.*—Calculated for $B_{10}H_{12}C_4$: B, 64.27; C, 28.54; H, 7.20. Found: B, 62.22; C, 28.70; H, 7.70.

This example is included only to show that some biscarborane is produced in the process for the preparation of carboranylacetylene. The yield of biscarborane using this process can be increased by the use of additional BAND, but, as set forth hereinbefore, this is not the preferred process.

EXAMPLE II

*Preparation of biscarborane.*—A solution of 84.0 grams (0.5 mole) of crude carboranylacetylene (M.P. 63–70° C.) in 500 ml. of dry acetonitrile and 101.0 grams (0.5 mole) of bisacetonitrile decaborane were refluxed overnight (approximately sixteen hours) under an atmosphere of nitrogen. The solution was allowed to cool to room temperature and the resulting crystalline solid was filtered. This solid was treated with 1.5 liters of benzene and filtered. The undissolved solid (BAND) amounted to 14.3 grams. The benzene filtrate was passed through a bed of basic alumina and evaporated to dryness yielding 65 grams of a crystalline white solid.

The reaction solution-filtrate was evaporated down to a volume of 100 ml. and filtered. The solid obtained was washed with a small amount of acetonitrile and amounted to 9.5 grams (BAND). The resulting filtrate was concentrated to a syrup, dissolved in benzene, and refluxed with 125 ml. of concentrated hydrochloric acid and 400 ml. of water for five hours. The benzene layer was separated, washed with 200 ml. of 10% sodium hydroxide, dried over magnesium sulfate, and filtered. The yellow solution was then passed through basic alumina and the resulting colorless solution evaporated to dryness. An additional 9.5 grams of white crystalline solid was obtained. Removal of unreacted carboranylacetylene was carried out by washing the combined products with pentane and drying the resulting material in vacuo. A total of 74.5 grams of biscarborane (M.P. 309–310° C.) was obtained, representing a yield of 59% based on carboranylacetylene, or 68% based on BAND. Biscarborane can be readily recrystallized from acetonitrile although no change in melting point of the product is observed.

*Analysis.*—Calculated for $B_{20}H_{22}C_4$: B, 75.3; C, 16.8; H, 7.70. Found: B, 75.30; C, 17.50; H, 8.20.

We claim:
1. Biscarborane of the formula

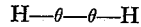

in which —θ— represents the radical —$C_2H_{10}B_{10}$—.

2. A process for the preparation of biscarborane which comprises reacting diacetylene with at least two moles of the bis(acetonitrile) adduct of decaborane,

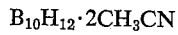

at a temperature of from 50° C. to 120° C. and recovering the biscarborane so formed.

3. A process for the preparation of biscarborane which comprises reacting in the presence of acetonitrile, diacetylene with a decaborane di-adduct of the formula

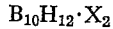

in which X is selected from the group consisting of $CH_3CN$, $(CH_3)_2S$ and $(C_2H_5)_2S$, separating carboranylacetylene of the formula HC≡C—θ—H, in which —θ— represents the radical —$C_2B_{10}H_{10}$—, and reacting the separated carboranylacetylene in acetonitrile with a decaborane di-adduct as hereinbefore described and recovering the biscarborane so formed.

4. A process as set forth in claim 3 in which the reaction temperature is from 75° C. to 90° C.

5. A process as set forth in claim 3 in which an inert solvent selected from the group consisting of benzene, toluene and xylene is used.

6. A process as set forth in claim 3 in which the reaction is conducted in an anhydrous atmosphere of an inert gas, nitrogen, helium, and argon.

No references cited.

TOBIAS E. LEVOW, *Primary Examiner.*

LEON D. ROSDOL, CARL D. QUARFORTH,
*Examiners.*